US012760161B2

(12) United States Patent
Chaudhary et al.

(10) Patent No.: US 12,760,161 B2
(45) Date of Patent: Oct. 13, 2026

(54) FOAMS MANUFACTURED USING SILICONE-FUNCTIONALIZED POLYETHYLENE AND METHODS OF MAKING THE SAME

(71) Applicant: Dow Global Technologies LLC, Midland, MI (US)

(72) Inventors: Bharat I. Chaudhary, Princeton, NJ (US); Jian Yang, Lake Jackson, TX (US); Arkady L. Krasovskiy, Lake Jackson, TX (US); Andrew Heitsch, Angleton, TX (US); Brian Dorvel, Pearland, TX (US)

(73) Assignee: Dow Global Technologies LLC, Midland, MI (US)

( * ) Notice: Subject to any disclaimer, the term of this patent is extended or adjusted under 35 U.S.C. 154(b) by 756 days.

(21) Appl. No.: 18/245,508

(22) PCT Filed: Sep. 16, 2021

(86) PCT No.: PCT/US2021/050585

§ 371 (c)(1),
(2) Date: Mar. 15, 2023

(87) PCT Pub. No.: WO2022/060928

PCT Pub. Date: Mar. 24, 2022

(65) Prior Publication Data

US 2023/0365771 A1 Nov. 16, 2023

Related U.S. Application Data

(60) Provisional application No. 63/079,113, filed on Sep. 16, 2020.

(51) Int. Cl.

| | |
|---|---|
| ***C08F 290/06*** | (2006.01) |
| ***C08F 290/14*** | (2006.01) |
| ***C08G 77/20*** | (2006.01) |
| ***C08G 77/442*** | (2006.01) |
| ***C08J 9/00*** | (2006.01) |
| ***C08J 9/12*** | (2006.01) |
| ***C08J 9/14*** | (2006.01) |
| ***C08K 5/101*** | (2006.01) |
| ***C08L 23/06*** | (2006.01) |
| ***C08L 51/08*** | (2006.01) |
| *C08G 101/00* | (2006.01) |

(52) U.S. Cl.

CPC ............ *C08J 9/0061* (2013.01); *C08G 77/20* (2013.01); *C08G 77/442* (2013.01); *C08J 9/0023* (2013.01); *C08J 9/141* (2013.01); *C08K 5/101* (2013.01); *C08G 2101/00* (2013.01); *C08G 2110/005* (2021.01); *C08J 2201/03* (2013.01); *C08J 2203/14* (2013.01); *C08J 2205/05* (2013.01); *C08J 2205/052* (2013.01); *C08J 2323/06* (2013.01)

(58) Field of Classification Search

None

See application file for complete search history.

(56) References Cited

U.S. PATENT DOCUMENTS

| | | | | |
|---|---|---|---|---|
| 3,644,230 | A | 2/1972 | Cronin | |
| 4,214,054 | A | 7/1980 | Watanabe et al. | |
| 6,069,183 | A * | 5/2000 | Wilkes | C08J 9/141 521/134 |
| 6,239,244 | B1 | 5/2001 | Stepp et al. | |
| 2012/0172545 | A1* | 7/2012 | Demirors | C08F 283/12 525/479 |
| 2017/0204239 | A1* | 7/2017 | Du | C08J 9/0061 |
| 2023/0365792 | A1* | 11/2023 | Krasovskiy | C08G 77/20 |

FOREIGN PATENT DOCUMENTS

| | | |
|---|---|---|
| CN | 106575545 A | 4/2017 |
| EP | 2478025 | 3/2011 |
| WO | 2011/032172 A2 | 3/2011 |

OTHER PUBLICATIONS

Chinese Office Action dated Nov. 28, 2024, pertaining to CN Patent Application No. 202180068960.X, 6 pgs.

Chinese Office Action dated Feb. 28, 2024, pertaining to CN Patent Application No. 202180068960.X, 14 pgs.

Brazilian Technical Report dated Jul. 4, 2025, pertaining to BR Patent Application No. BR 11 2023 004616.5, 8 pgs.

Japanese Office Action dated Jul. 1, 2025, pertaining to JP Patent Application No. 2023-515790, 6 pgs.

Balke, Stephen T. et al., "A Strategy for Interpreting Multidetector Size-0Exclusion Chromatography Data II: Applications in Plastic Waste Recovery," Chromatography of Polymers, Chapter 13, pp. 199-219 (1992).

International Search Report and Written Opinion of related International Patent Application No. PCT/US2021/050585 dated Jan. 5, 2022 (14 total pages).

Kratochvil, P., "Fundamental Light-Scattering Methods," Classical Light Scattering from Polymer Solutions, Chapter 13, pp. 113-144 (1987).

Thomas H. Mourey and Stephen T. Balke, "A Strategy for Interpreting Multidetector Size-Exlcusion Chromatography Data I: Development of a Systematic Approach," Chromatography of Polymers, Chapter 12, pp. 180-198 (1992).

Baozheng Tian, et al., "Synthesis of polyethylene-g-polydimethylsiloxane graft copolymers by copolymerization of ethylene with polydimethylsiloxane macromonomer," European Polymer Journal 118, pp. 578-585 (2019).

(Continued)

*Primary Examiner* — Melissa A Rioja

(74) *Attorney, Agent, or Firm* — Dinsmore & Shohl LLP

(57) ABSTRACT

According to various embodiments, an extruded foam is formed from a composition comprising from 1 to 99 wt % of a silicone-functionalized polyethylene comprising a reaction product of the polymerization of ethylene and (meth) acrylic ester functionalized polydimethylsiloxane, and a physical blowing agent. The foam has a density of less than or equal to 0.200 $g/cm^3$ as measured in accordance with ASTM D1622-88 at 25° C.

14 Claims, No Drawings

(56) References Cited

OTHER PUBLICATIONS

Williams and Ward, "The Construction of a Polyethylene Calibration Curve for Gel Permeation Chromatography Using Polystyrene Fractions," J. Polym. Sci., Polymer Letters, vol. 6, pp. 621-624 (1968).
Bruno H. Zimm, "Apparatus and Methods for Measurement and Interpretation of the Angular Variation of Light Scattering; Preliminary Results on Polystyrene Solutions," The Journal of Chemical Physics, vol. 16, No. 12, pp. 1099-1116 (1948).
Korean Office Action dated Apr. 14, 2026, pertaining to KR Patent Application No. 10-2023-7012590, 11 pgs.

* cited by examiner

FOAMS MANUFACTURED USING SILICONE-FUNCTIONALIZED POLYETHYLENE AND METHODS OF MAKING THE SAME

CROSS REFERENCE TO RELATED APPLICATIONS

This application claims priority to U.S. Provisional Patent Application No. 63/079,113, filed on Sep. 16, 2020, and International Patent Application No. PCT/US2021/050585, filed on Sep. 16, 2021, the entireties of both which are hereby incorporated by reference.

TECHNICAL FIELD

Embodiments of the present disclosure are generally related to ethylene polymer foams, and are more particularly related to foams manufactured using silicone-functionalized polyethylenes.

BACKGROUND

Conventional polyethylene foams having densities of less than 0.200 g/cm$^3$, referred to as “low density foams,” can be made by a variety of processes and using a variety of polymers. However, the processes for making such foams can exhibit low blowing efficiencies. Additionally such foams are typically limited to a closed-cell structure, especially when made by an extrusion process.

Accordingly, a need exists for alternative ethylene polymer foams.

SUMMARY

The present disclosure meets these needs by providing extruded foams formed from compositions comprising a silicone-functionalized polyethylene comprising a functionalized polydimethylsiloxane bound to polyethylene and a physical blowing agent. In embodiments, the foam has a density of less than or equal to 0.200 g/cc as measured in accordance with ASTM D1622-88 at 25° C. Such foams can have open- or closed-cell structures and, in embodiments, exhibit improved blowing agent efficiency (i.e., lower density) than foams without silicone-functionalized polyethylene using the same amount of blowing agent.

According to a first embodiment of the present disclosure, an extruded foam is formed from a composition comprising: from 1 to 99 wt % of a silicone-functionalized polyethylene comprising a reaction product of the polymerization of ethylene and (meth)acrylic ester functionalized polydimethylsiloxane; and a physical blowing agent; wherein the foam has a density of less than or equal to 0.200 g/cm$^3$ as measured in accordance with ASTM D1622-88 at 25° C.

According to a second embodiment, an extruded form comprises the extruded foam of the previous embodiment, wherein the silicone-functionalized polyethylene has a polydispersity index (PDI) of from 3 to 14.

According to a third embodiment, an extruded form comprises the extruded foam of any of the previous embodiments, wherein the silicone-functionalize polyethylene comprises one or more of the following structures:

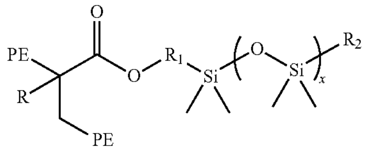

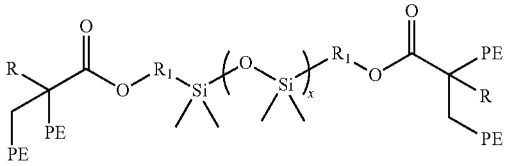

and

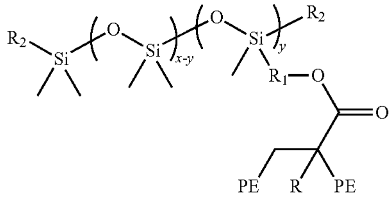

where R is methyl or hydrogen, R1 is a bridge group that connects functional group ((meth)acrylate) with siloxane, R2 is an end group selected from the group consisting of alkyl, substituted alkyl, aryl, alkenyl, H, and OH, x is an integer from 10 to 1000, and y is an integer from 1 to 20.

According to a fourth embodiment, an extruded form comprises the extruded foam of any of the previous embodiments, wherein the composition further comprises from greater than 0 to 99 wt % olefinic polymer.

According to a sixth embodiment, an extruded form comprises the extruded foam of any of the previous embodiments, wherein the olefinic polymer comprises LDPE.

According to a seventh embodiment, an extruded form comprises the extruded foam of any of the previous embodiments, wherein the composition further comprises from greater than 0 to 2 wt % permeability modifier.

According to an eighth embodiment, an extruded form comprises the extruded foam of any of the previous embodiments, wherein the permeability modifier comprises an amide or an ester of a C10 to C24 fatty acid.

According to a ninth embodiment, an extruded form comprises the extruded foam of any of the previous embodiments, wherein the physical blowing agent comprises isobutane, carbon dioxide, n-butane, isomers of pentane, hydrocarbons, or mixtures thereof.

According to a tenth embodiment, an extruded form comprises the extruded foam of any of the previous embodiments, wherein the physical blowing agent is present in an amount of 5 to 20 wt %.

According to an eleventh embodiment, an extruded form comprises the extruded foam of any of the previous embodiments, wherein the foam is open-cell.

According to a twelfth embodiment, an extruded form comprises the extruded foam of any of the previous embodiments, wherein the foam has a density of from 0.090 to 0.200 g/cm$^3$.

According to a thirteenth embodiment, an extruded form comprises the extruded foam of any of the first through tenth embodiments, wherein the foam is closed-celled.

According to a fourteenth embodiment, an extruded form comprises the extruded foam of any of the first through tenth or thirteenth embodiments, wherein the foam has a density of from 0.015 to 0.200 g/cm$^3$.

These and other embodiments are described in more detail in the following detailed description.

DETAILED DESCRIPTION

Specific embodiments of the present application will now be described. The disclosure may, however, be embodied in different forms and should not be construed as limited to the embodiments set forth in this disclosure. Rather, these embodiments are provided so that this disclosure will be thorough and complete, and will fully convey the scope of the subject matter to those skilled in the art.

Definitions

Any reference to the Periodic Table of Elements is in reference to the International Union of Pure and Applied Chemistry (IUPAC) periodic table.

The numerical ranges disclosed herein include all values from, and including, the upper and lower values. For ranges containing explicit values (e.g., from 1 or 2 or 3 to 5 or 6 or 7), any subrange between any two explicit values is included (e.g., the range 1-7 above includes subranges of from 1 to 2; from 2 to 6, from 5 to 7; from 3 to 7; from 5 to 6; etc.).

Unless stated to the contrary, implicit from the context, or customary in the art, all parts and percentages are based on weight and all test methods are current as of the filing date of this disclosure.

The term "composition" refers to a mixture of materials which comprise the composition, as well as reaction products and decomposition products formed from the materials of the composition.

The terms "comprising," "including," "having," and their derivatives, are not intended to exclude the presence of any additional component, step, or procedure, whether or not the same is specifically disclosed. In contrast, the term "consisting essentially of" excludes from the scope of any succeeding recitation any other component, step, or procedure, excepting those that are not essential to operability. The term "consisting of" excludes any component, step, or procedure not specifically delineated or listed. The term "or," unless stated otherwise, refers to the listed members individually as well as in any combination. Use of the singular includes the use of the plural and vice versa.

As used herein, a "pendant functional group" refers to a functional group on a polymer backbone at a location other than a terminal end.

The term "polymer" refers to a polymeric compound prepared by polymerizing monomers, whether of the same or a different type, that in polymerized form provide the multiple and/or repeating "units" that make up a polymer. The generic term polymer thus embraces the term "homopolymer," usually employed to refer to polymers prepared from only one type of monomer as well as "copolymer" which refers to polymers prepared from two or more different monomers. It is noted that although a polymer is often referred to as being "made of" one or more specified monomers, "based on" a specific monomer or monomer type, "containing" a specified monomer content, or the like, in this context, the term "monomer" is understood to be referring to the polymerized remnant of the specified monomer.

The terms "blend" or "polymer blend," as used herein, refer to a mixture of two or more polymers. A blend may or may not be miscible (not phase separated at the molecular level). A blend may or may not be phase separated. A blend may be effected by physically mixing the two or more polymers on the macro level (for example, melt blending resins or compounding), or the micro level (for example, simultaneous forming within the same reactor).

The term "terminal alkene group," as used herein, refers to a double bond between two carbon atoms in a polymer chain, wherein one of the carbons in the double-bond is a =CH2 group. Terminal double bonds are located at terminal ends of polymer chains and/or at branched ends of polymer chains. The term "internal alkene group," as used herein, refers to a 1,2-disubstituted carbon-carbon double bond, the carbon atoms are in a trans-configuration (not a cis-configuration). Terminal alkene groups and internal alkene groups are measured by infrared spectroscopy ("IR").

An "olefin-based polymer" or "polyolefin" or "olefinic polymer" as used herein is a polymer that contains more than 50 weight percent polymerized olefin monomer (based on total amount of polymerizable monomers), and optionally, may contain at least one comonomer. Non-limiting examples of olefin-based polymer include ethylene-based polymer and propylene-based polymer (such as polypropylene).

"Polyethylene" or "ethylene polymer" or "ethylene-based polymer" shall mean polymers comprising greater than 50% by mole of units which have been derived from ethylene monomer. This includes polyethylene homopolymers or copolymers (meaning units derived from two or more comonomers). Common forms of polyethylene known in the art include Low Density Polyethylene (LDPE); Linear Low Density Polyethylene (LLDPE); Ultra Low Density Polyethylene (ULDPE); Very Low Density Polyethylene (VLDPE); Medium Density Polyethylene (MDPE); and High Density Polyethylene (HDPE).

The term "LDPE" may also be referred to as "high pressure ethylene polymer" or "highly branched polyethylene" and is defined to mean that the polymer is partly or entirely homopolymerized or copolymerized in autoclave or tubular reactors at pressures above 14,500 psi (100 MPa) with the use of free-radical initiators, such as peroxides (see for example U.S. Pat. No. 4,599,392, which is hereby incorporated by reference). LDPE resins typically have a density in the range of 0.916 to 0.935 g/cm.

As used herein, the term "siloxane" includes polysiloxanes and lower molecular weight siloxanes. In embodiments, the siloxane is polydimethylsiloxane (PDMS) with various end groups described below.

As used herein, "cell density" refers to the number of foam cells in a unit volume of the foam composition.

The term "closed-cell foam," as used herein, is a foam in which the foam cells are separated by membrane walls of polymeric material that do not have openings. A closed-cell volume is not as readily in fluid communication with its external atmosphere as an open-cell foam. The term "open-cell foam," as used herein, is one in which either (i) there are no membrane walls of polymeric material separating the foam cells or (ii) there are openings in the membrane walls of polymeric material. An open-cell volume is in fluid communication with its external atmosphere.

The terms "foam" and "foam composition," as used herein, refer to a structure constructed from a polymer and comprising a plurality of channels extending from the surface of the structure into, and through, the structure. The channels are free of direction with respect to the longitudinal extension of the structure. The channels comprise a plurality of foam cells that are in fluid communication with the external atmosphere. The term "foam cell," or "cell," as used herein, is a discrete space within the foam composition. The foam cell is separated, or otherwise defined, by membrane walls comprising the polymer of the foam composition.

The term "foaming temperature" refers to the final set temperature in a cooling section of a foam extruder or other suitable heat exchanger, the cooling section or other suitable heat exchanger located directly upstream of the exit die. For example, the foaming temperature may be the set temperature of the last zone of an extruder used to cool the foamable composition. The set temperature may or may not be different from the extrudate (foamable composition) melt temperature that is measured at the exit die.

Silicone-Functionalized Polyethylenes

Various embodiments include foams prepared from a composition comprising one or more silicone-functionalized polyethylenes and a physical blowing agent. The silicone-functionalized polyethylene includes copolymer of ethylene and functionalized polydimethylsiloxane (f-PDMS). In some such embodiments in which the polyethylene is a low density polyethylene (LDPE), the silicone-functionalized polyethylene may be referred to herein as "LDPE-co-PDMS." In embodiments, the copolymers are formed by high pressure, free-radical polymerization by reacting ethylene monomer and f-PDMS, or by reacting ethylene monomer and a mixture of functionalized polysiloxanes. In embodiments, PDMS is attached to the high pressure ethylene polymer via several covalent bonds that result from the reaction of the initial functional group of the functionalized PDMS with growing propagating chain of the ethylene polymer followed up by further reaction with ethylene monomers and also includes bridge between functional group that gets polymerized and siloxane. Methods of preparing the LDPE-co-PDMS are described herein.

In embodiments, the LDPE-co-PDMS may include from 0.1 wt % to 50 wt % of PDMS, such as from 0.1 wt % to 20 wt %, from 0.1 wt % to 15 wt %, from 0.5 wt % to 15 wt %, from 3 wt % to 15 wt %, or from 5.0 wt % to 15 wt %, based on a total weight of the LDPE-co-PDMS composition which also include LDPE formed during copolymerization but not covalently attached to PDMS.

In various embodiments, the copolymer of ethylene and f-PDMS comprises LDPE-co-PDMS having one or more of the following structures, but not limited to:

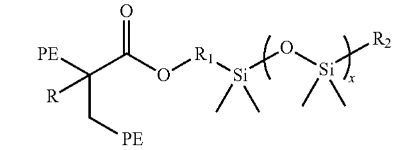

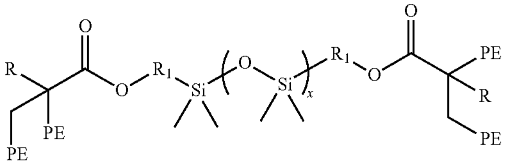

and

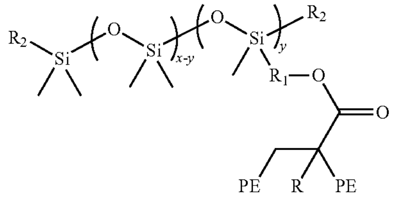

where R is methyl or hydrogen, $R^1$ is a bridge group that connects functional group ((meth)acrylate) with siloxane, R2 is an end group selected from the group consisting of alkyl, substituted alkyl, aryl, alkenyl, H, and OH, x is an integer from 10 to 1000, and y is an integer from 1 to 20. $R^1$ and $R^2$ groups can be the same or different.

In embodiments, the bridge group of the LDPE-co-PDMS is selected from substituted or unsubstituted $C_2$-$C_{20}$ alkylene linker where one or more carbon atoms can be substituted with oxygen and/or silicon, a substituted or unsubstituted aryl group, and derivatives and combinations thereof. In embodiments, the functional group bound to the bridge group is bound to the high pressure ethylene polymer by means of polymerization with ethylene monomer. In various embodiments, the functional group is a (meth)acrylate ester group. In further embodiments, the bridge group is the group depicted below:

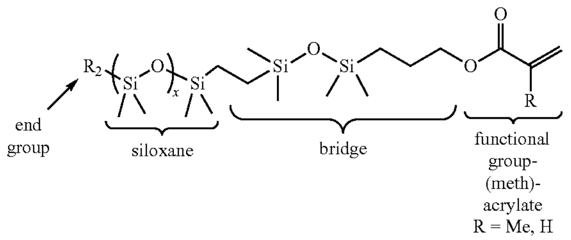

In the structural formulas above, the ethylene-based polymeric branch is depicted as being a polyethylene (PE), but it is contemplated that, in embodiments, the ethylene-based polymeric branch can be a homopolymer (e.g., LDPE) or a copolymer, such as an ethylene (meth)acrylic ester copolymer, or ethylene (meth)acrylic acid copolymer, or ethylene vinyltrimethoxysilane copolymer, or ethylene vinyl acetate copolymer.

The polymer comprises a polysiloxane unit, which in embodiments, is derived from functionalized polydimethylsiloxane (e.g., f-PDMS). In embodiments, the functionalized polysiloxane is a (meth)acrylate ester functionalized polymethyldisiloxane (f-PDMS), where (meth)acrylate function attached to the PDMS via a bridge.

Functionalized Polysiloxane

The polysiloxane can be any of a diverse class of polymers manufactured as fluids, resins, or elastomers. Polysiloxanes are partially organic compounds, but, unlike most polymers, they have a backbone containing no carbon, composed instead of alternating silicon and oxygen atoms, as shown above. Although in the structural formulas shown above, each silicon is illustrated as being bound to a methyl and/or R groups, it is contemplated that each of those positions can individually be an alkyl, vinyl, phenyl, hydrogen, hydroxyl, acetoxy, enoxy, oxime, methoxy, ethoxy, alkoxy, dimethylamino, aminopropyl, hydroxypropyl, mercaptopropyl, chloropropyl, acryloxyprogpyl, methacryloxypropyl, epoxypropoxypropyl, or epoxycyclohexylethyl. In embodiments, each position is methyl.

In some embodiments, x is sufficiently large such that the polysiloxane has a viscosity of 100 or more, 200 or more, or 500 or more, centistokes (CST). In embodiments, x is no larger than would produce a polysiloxane with a viscosity no greater than 2.5 million CST. However it is contemplated that the upper limit on the viscosity is lower than 2.5 million CST, for example, 1 million or 600,000 CST.

Polysiloxanes suitable for use in various embodiments include those described in U.S. Pat. No. 6,239,244, the entire contents of which is hereby incorporated by reference in its entirety. The polysiloxanes, and are commercially available from a number of different manufacturers including, but not limited to Dow, Momentive, Wacker, Shin-Etsu, and Evonik.

In various embodiments described herein, the polysiloxane is a polydimethylsiloxane (PDMS) that includes one or more functional groups and is, therefore, referred to a functionalized PDMS, or f-PDMS. In various embodiments, the f-PDMS is a (meth)acrylate ester functionalized PDMS, where the (meth)acrylate ester group is bonded to the PDMS through a bridge group. The PDMS may be monofunctional or difunctional or polyfunctional, and the functional group(s) may be linked at a terminal or pendant location on the siloxane. Accordingly, in embodiments, the f-PDMS comprises the structural formula of one of the following formulas or combinations thereof:

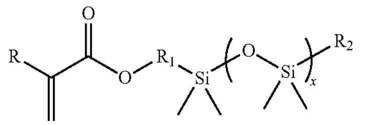

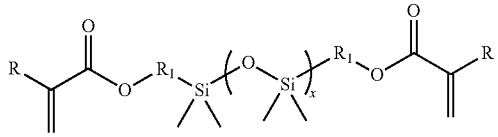

or

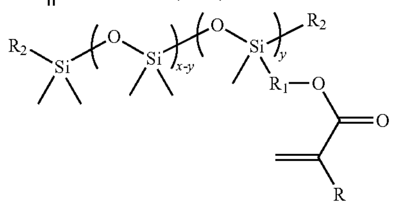

where R is methyl or hydrogen, $R^1$ is a bridge group, $R^2$ is an end group selected from alkyl, aryl, alkenyl, H, or OH, x is an integer from 10 to 1000, and y is an integer from 1 to 20.

Process—Functionalized Polysiloxane

In various embodiments, each of the bridge groups in f-PDMS is determined by the method in which the siloxane backbone is linked to the (meth)acrylate functionality. In embodiments, the siloxane backbone is linked to the (meth) acrylate functionality through direct hydrosilylation with an alkenyl (meth)acrylate, hydrosilylation of mono- or polyvinyl PDMS using an SiH functional (meth)acrylate converter, or equilibration/condensation with a (meth)acrylate functional alkoxy silane. Other methods for linking the siloxane backbone and the (meth)acrylate functionality are contemplated and may be used, depending on the particular embodiment.

Process—Copolymers of Ethylene and Functionalized Polysiloxane

In various embodiments, the LDPE-co-PDMS is formed in the presence of ethylene. In embodiments, the LDPE-co-PDMS is produced via a high pressure, free-radical polymerization process. Two different high pressure free-radical initiated polymerization process types are known. In the first process type, an agitated autoclave reactor having one or more reaction zones is used. The autoclave reactor includes several injection points for initiator or monomer feeds, or both. In the second process type, a jacketed tube is used as a reactor, which has one or more reaction zones. Suitable reactor lengths include, but are not limited to, from 100 to 3000 meters (m), or from 1000 to 2000 m. The beginning of a reaction zone, for either type of reactor, is typically defined by the side injection of initiator of the reaction, ethylene, chain transfer agent (or telomer), comonomer(s), or combinations thereof. A high pressure process can be carried out in autoclave reactors or tubular reactors having one or more reaction zones, or in a combination of autoclave reactors and tubular reactors, each comprising one or more reaction zones.

In various embodiments, chain transfer agents (CTAs) may be used to control polymer properties, including but not limited to, molecular weight of the resultant polymer and the melt index. Chain transfer involves the termination of growing polymer chains, thus limiting the ultimate molecular weight of the polymer material. Chain transfer agents are typically hydrogen atom donors that will react with a growing polymer chain and stop the polymerization reaction of the chain. For high pressure free radical polymerization, CTAs can be of many different types, such as saturated hydrocarbons, unsaturated hydrocarbons, aldehydes, ketones, or alcohols. Non-limiting examples of CTAs include propylene, isobutane, n-butane, 1-butene, methyl ethyl ketone, acetone, ethyl acetate, propionaldehyde, products available under the tradename ISOPAR™ (available from ExxonMobil Chemical Co.), and isopropanol. In embodiments, the amount of CTA used in the process is from 0.01 wt % to 10 wt % of the total reaction mixture.

In embodiments, the free radical initiator can include a CTA as a solvent or as a blend for simultaneous injection with ethylene. For example, a CTA may be blended with ethylene, pressurized, and then injected into the reactor.

In various embodiments, one or more free radical initiators are used to produce the LDPE-co-PDMS. Free radical initiators that are generally used to produce ethylene-based polymers, such as LDPE, are oxygen and peroxides. Non-limiting examples of free radical initiators include t-butyl peroxy pivalate, di-t-butyl peroxide, t-butyl peroxy acetate (TPA), t-butyl peroxyoctoate (TPO), t-butyl peroxy-2-hexanoate, and combinations thereof. Other initiators known and used in the art are contemplated. In embodiments, the initiator is included in conventional amounts, such as from 0.005 wt % to 0.2 wt % based on the weight of polymerizable monomers. In embodiments, the initiator is injected prior to the reaction zone or within the reaction zone where free radical polymerization is to be induced. Termination of catalyst activity may be achieved by a combination of high reactor temperatures for the free radical polymerization portion of the reaction, or by feeding initiator into the reactor dissolved in a mixture of a polar solvent such as propanol, water, or conventional initiator solvents, such as branched or unbranched alkanes. In embodiments, the free radical initiator initiate polyethylene chain formation, followed by an attack of this propagating chain onto functional group of the f-PDMS (e.g., the (meth)acrylate ester group), followed by further reaction of the freshly formed α-carbonyl radical with ethylene monomers thus enabling the ethylene (in either monomeric or polymeric form) to attach to the (meth) acrylate ester.

In embodiments, at least one hydrocarbon solvent may be included in the free radical initiator system. The hydrocarbon solvent may, for example, be a $C_5$ to $C_{30}$ hydrocarbon solvent. Exemplary hydrocarbon solvents include, by way of example and not limitation, mineral solvents, normal paraffinic solvents, isoparaffinic solvents, cyclic solvents, and the like. In embodiments, the hydrocarbon solvents are selected from the group consisting of n-octane, iso-octane (2,2,4-trimethylpentane), n-dodecane, iso-dodecane (2,2,4,6,6,-pentamethylheptane), and other isoparaffinic solvents. Example hydrocarbon solvents such as isoparaffinic solvents, for example, are commercially available under the trademarks ISPAR C, ISOPAR E, and ISOPAR H from ExxonMobil Chemical Co. In embodiments, the hydrocarbon solvent comprises less than 99 wt % of the free radical initiator system.

Embodiments may further include a polar co-solvent, such as an alcohol co-solvent (e.g., a $C_1$ to $C_{30}$ alcohol), an aldehyde, a ketone, or an ester. The alcohol functionality of the alcohol co-solvent may be mono-functional or multi-functional. Suitable alcohol co-solvents can include, by way of example and not limitation, isopropanol (2-propanol), allyl alcohol, 1-pentanol, methanol, ethanol, propanol, 1-butanol, 1,4-butanediol, combinations thereof, or mixtures thereof. In embodiments, the polar co-solvent may be included in an amount of less than 40 wt % of the free radical initiator system.

Other additives, such as processing aids, plasticizers, stabilizers, ultraviolet light absorbers, antistatic agents, pigments, dyes, nucleating agents, fillers, slip agents, fire retardants, lubricants, smoke inhibitors, viscosity control agents, and anti-blocking agents. In embodiments, one or more of the additives are included in an amount of less than 50 wt % of the combined weight of the additives, based on the weight of the polymer.

In embodiments, the process includes a process recycle loop to further improve conversion efficiency. In such embodiments, the downstream reaction area or zone is maintained at a temperature that is lower than that at which the ethylene-based polymer would phase separate from the polysiloxane. In embodiments, the recycle loop may be treated to neutralize residues or byproducts from the previous reaction cycle, since such residues or byproducts may inhibit polymerization of either the polysiloxane or the ethylene-based polymer.

Ethylene, f-PDMS, initiator, and CTA are each added to the reactor at one or more locations to achieved desired ratios of components in the feeds to and or in the reaction zones of the reactor. As will be appreciated by those skilled in the art, the choice of feed point for each component into the reactor and/or a reaction zone depends on several factors, including, but not limited, to the solubility and/or condensation of components in pressurized ethylene and/or fouling that may occur in the pre-heater used to heat the reactor contents prior to injection of the initiator.

Ethylene used for the production of the LDPE-co-PDMS may be purified ethylene obtained by removing polar components from a loop recycle stream or a reaction system configuration in which only fresh ethylene is used for making the LDPE-co-PDMS polymer.

In embodiments, the polymerization is carried out in a continuously stirred tank reactor using propylene as a chain transfer agent. Ethylene and propylene are fed to the top of the reactor along the agitator shaft. In embodiments, tert-butyl peroxyacetate (TPA) and tert-butyl peroxyoctoate (TPO) are used as initiators injected into the side of the reactor. In embodiments, the f-PDMS is separately injected into the side of the reactor.

In embodiments, the maximum temperature in each reaction zone is from 150° C. to 360° C., from 170° C. to 350° C., or from 200° C. to 325° C. In embodiments, the polymerization pressure at the inlet of the reactor is from 100 MPa to 360 MPa, from 150 MPa to 340 MPa, or from 185 MPa to 320 MPa. Following polymerization, the contents of the reactor, including unreacted reactants and the LDPE-co-PDMS polymer, are emitted from an outlet of the reactor.

The LDPE-co-PDMS polymer may be separated from any remaining reactants according to any method known and used in the art. In embodiments, atomization is used to separate the LDPE-co-PDMS polymer from the remaining reactants, and the LDPE-co-PDMS polymer is collected in powder form.

Although certain particular LDPE-co-PDMS structures are illustrated in the figures and structures presented herein, it is contemplated that other structures are possible and contemplated. Additionally, in embodiments, the LDPE-co-PDMS polymer is present in a blend comprising one or more of the structures depicted herein. For example, in embodiments, in addition to attachment of the f-PDMS to LDPE by copolymerizing the double bond of the functional group with ethylene, the reaction may also yield some amount of by-product where LDPE is attached to PDMS through methyl group of the PDMS via chain transfer mechanism. Moreover, it should be appreciated that the LDPE-co-PDMS may constitute only some amount of the reaction product, with a major portion of the reaction product being LDPE. In embodiments, the LDPE-co-PDMS is present in a blend comprising at least one additional polymer. The additional polymer can be, for example, a low density polyethylene (LDPE), a linear low density polyethylene (LLDPE), ultra low density polyethylene (ULDPE), very low density polyethylene (VLDPE), medium density polyethylene (MDPE), high density polyethylene (HDPE), a copolymer including a (meth)acrylate ester, a copolymer comprising (meth)acrylic acid, mono- or diester of maleic acid, a copolymer comprising vinyl acetate, a copolymer comprising trialkoxy vinylsilane, grafted polyethylenes, or derivatives or combinations thereof.

In embodiments, the LDPE-co-PDMS may have a polydispersity index (PDI) of from 3.0 to 50.0, such as from 3.0 to 45.0, from 3.0 to 40.0, from 3.0 to 35.0, from 3.0 to 30.0, from 3.0 to 20.0, from 3.0 to 15.0, from 3.0 to 10.0, from 4.0 to 50.0, such as from 4.0 to 45.0, from 4.0 to 40.0, from 4.0 to 35.0, from 4.0 to 30.0, from 4.0 to 20.0, from 4.0 to 15.0, from 4.0 to 10.0, from 5.0 to 50.0, such as from 5.0 to 45.0, from 5.0 to 40.0, from 5.0 to 35.0, from 5.0 to 30.0, from 5.0 to 20.0, from 5.0 to 15.0, from 5.0 to 10.0, from 7.0 to 50.0, such as from 7.0 to 45.0, from 7.0 to 40.0, from 7.0 to 35.0, from 7.0 to 30.0, from 7.0 to 20.0, from 7.0 to 15.0, from 7.0 to 10.0, from 8.0 to 50.0, such as from 8.0 to 45.0, from 8.0 to 40.0, from 8.0 to 35.0, from 8.0 to 30.0, from 8.0 to 20.0, from 8.0 to 14.0, or from 8.0 to 10.0. In embodiments, the LDPE-co-PDMS may have a PDI of from 3.0 to 14.0, from 5.0 to 14.0, or from 7.0 to 14.0. In embodiments, the LDPE-co-PDMS may have a melt index ($I_2$) of from 0.15 to 500.00 g/10 min, such as from 0.15 to 100 g/10 min, from 0.15 to 25.00 g/10 min, from 0.15 to 10.00 g/10 min, from 0.3 to 1.7, from 0.3 to 2.0, from 0.3 to 3.0, from 0.3 to 10, from 0.5 to 1.7, from 0.5 to 2.0, from 0.5 to 3.0, from 0.5 to 10, from 1.0 to 1.7, from 1.0 to 2.0, from 1.0 to 3.0, from 1.0 to 10, from 1.3 to 1.7, from 1.3 to 2.0, from 1.3 to 3.0, from 1.3 to 10, from 0.50 to 10.00 g/10 min, or from 0.50 to 7.50 g/10 min. PDI is determined by "conventional GPC" or "3D-GPC".

Physical Blowing Agent

As described above, in addition to the silicone-functionalized polyethylene, the composition from which the foam is formed includes a physical blowing agent.

The term "physical blowing agent," as used herein, is a compound, or composition, that (i) is dissolved in the polymer composition under the extrusion conditions, by virtue of being sufficiently soluble in the polymer composition at those conditions and (ii) comes out of solution under conditions (temperature, pressure) encountered during formation of a foam composition, as the foamable composition exits the die. The physical blowing agent is added to the polymer composition under the extrusion conditions to form a foamable composition. The term "foamable composition," as used herein, is a mixture of the polymer composition and the physical blowing agent under the extrusion conditions.

In embodiments, the physical blowing agent is added to the polymer composition at a location downstream of the extruder inlet.

As will be described herein, the extrusion conditions at a temperature from 50° C. to 250° C. include a pressure high enough to (i) prevent the blowing agent from creating expansion of the polymer composition and/or the foamable composition within the extruder or other suitable melt processing equipment and (ii) enable homogeneous dispersion of the blowing agent within the polymer composition. In embodiments, the extrusion conditions include a temperature from 140° C. to 200° C. and a pressure from 1.40 to 3.00 MPa, or a temperature from 150° C. to 190° C. and a pressure from 1.80 to 2.80 MPa, or a temperature from 160° C. to 180° C. and a pressure from 2.20 to 2.60 MPa.

Nonlimiting examples of suitable physical blowing agent include $C_1$-6 hydrocarbons such as acetylene, propane, propene, n-butane, butene, butadiene, isobutane, isobutylene, cyclobutane, cyclopropane, ethane, methane, ethene, isomers of pentane, pentene, cyclopentane, pentene, pentadiene, hexane, cyclohexane, hexene, and hexadiene, $C_1$-5 organohalogens, $C_{1-6}$ alcohols, $C_{1-6}$ ethers, $C_{1-5}$ esters, $C_{1-5}$ amines, alcohols, ammonia, nitrogen, carbon dioxide, water, neon, helium, and combinations thereof. In embodiments, the physical blowing agent is one or more of n-butane, isobutane, n-pentane, isopentane, neopentane, carbon dioxide, ethanol, and 1,1-difluoroethane (HFC-152a).

The physical blowing agent, (e.g., isobutane), may be present in an amount from 0.5 to 30 wt %, or from 2 to 25 wt %, or from 5 to 20 wt %, or from 8 to 15 wt %, based upon the total weight of the foamable composition, depending on the particular embodiment. In embodiments, the LDPE-co-PDMS exhibits an improved blowing efficiency such that the amount of physical blowing agent may be decreased as compared to a similar foamable composition without the LDPE-co-PDMS (e.g., a composition including LDPE and the blowing agent) in the foamable composition, to attain a given foam density.

In an embodiment, a chemical blowing agent is used and generates one or more physical blowing agents, by thermal decomposition in the process. Chemical blowing agents include (but are not limited to) azodicarbonamide, azodiisobutyro-nitrile, barium azodicarboxylate, N,N'-dimethyl-N,N'-dinitrosoterephthalamide, and benzenesulfonhydrazide, 4,4-oxybenzene sulfonyl semicarbazide, and p-toluene sulfonyl semicarbazide, trihydrazino triazine and mixtures such as those of citric acid and sodium bicarbonate. Examples of chemical blowing agents are the various products sold under the tradename Safoam™ (products of Reedy International; Reedy Chemical Foam).

Permeability Modifier

In embodiments, the composition may further include a permeability modifier. The term "permeability modifier," as used herein, is a compound or composition, which decreases the permeability of the blowing agent in a given polyolefin, such that the blowing agent permeates out of a foam made with that polyolefin at approximately the same rate that air diffuses in. This can result in a dimensionally stable foam. Without a permeability modifier, a blowing agent such as isobutane permeates out of a foam faster than air permeates in, which can lead to dimensional instability of the foam, especially at low foam densities, thereby leading to foam shrinkage and deterioration in foam properties.

Non-limiting examples of permeability modifiers that may be used in various embodiments include amides and esters of $C_{10}$ to $C_{24}$ fatty acids, as described in U.S. Pat. Nos. 3,644,230 and 4,214,054, the entirety of each of which is hereby incorporated by reference herein. Esters may also reduce static during and after foam manufacture. In embodiments, the permeability modifier includes stearyl stearamide, glycerol monostearate, glycerol monobehenate, and sorbitol monostearate. Combinations of any of these permeability modifiers are also possible and contemplated. When used, such permeability modifiers are typically employed in amounts ranging from greater than 0 to 10 wt %, based on a total weight of the polymer composition. For example, the permeability modifier may be present in an amount from 0.01, or 0.1, or 0.2, or 0.3, or 0.5 to 1.0, or 2.0, or 5.0 wt % based upon the total weight of the polymer composition. In embodiments, the permeability modifier is present in an amount from 0.01 to 5.0, or from 0.1 to 2.0 or from 0.2 to 2.0 wt % based upon the total weight of the polymer composition.

In embodiments, the permeability modifier is a fatty acid ester. The fatty acid ester has an alpha-monoester (or monoglyceride) content ranging from 30 to 99%, or 40 to 95%, or 50 to 90%. In embodiments, the permeability modifier is glycerol monostearate.

In embodiments, the permeability modifier (e.g., glycerol monostearate) is a component of a masterbatch. In such embodiments, the permeability modifier (e.g., glycerol monostearate) may be present in the masterbatch in an amount from 0.5, or 1, or 1.5, or 2 to 2.5, or 3.5, or 5, or 10, or 20, or 30, or 40, or 50 wt, or 60 wt %. For example, the permeability modifier (e.g., glycerol monostearate) may be present in the masterbatch in an amount from 0.5 to 60 wt %, or from 1 to 50 wt %, or from 2 to 30 wt %, or from 5 to 20 wt %.

Extrusion Process—Foam

In various embodiments, the composition is used to produce an extruded foam. The extruded foam can be produced according to any extrusion foam process known and used in the art. For example, the LDPE-co-PDMS and the permeability modifier (if included) may be simultaneously heated and blended in one or more extruders (e.g., a mixing extruder) at a temperature from 140° C. to 250° C., or from 15 0° C. to 230° C., or from 160° C. to 220° C., or from 170° C. to 200° C. or from 160° C. to 190° C. and a pressure from 0.1 to 70, or from 0.5 to 60, or from 1 to 50, or from 2 to 40, or from 3 to 30, or from 4 to 20, or from 6 to 10 megaPascal (MPa) to form the polymer composition in a flowable state. The polymer composition may also be known as an extrudate.

In embodiments, one or more additional components may be added to the extrudate along with the LDPE-co-PDMS and the permeability modifier, such as a cell nucleating agent, an olefinic polymer, antistatic agents, pigments, fillers, or other additives known and used in the art.

Cell nucleating agents, when added to the extrudate, facilitate formation of one or more foam cells, and can lead to smaller cell sizes and a higher cell density. In embodiments, the cell nucleating agent may be talc, calcium carbonate, or a chemical blowing agent. For example, the cell nucleating agent may be added to the extrudate as a talc coating on LDPE-co-PDMS pellets. When included, the cell nucleating agent may be present in an amount of from 0.01 to 10.0 wt %, based on a total weight of the foamable composition.

Olefinic polymers, such as polyethylene or polypropylene, may be included along with the LDPE-co-PDMS. For example, in embodiments, the LDPE-co-PDMS may be one polymer in a blend of polymers. In embodiments, the LDPE-co-PDMS and one or more polyethylene polymers, such as LDPE, may be blended together and added into the extruder. When present, the olefinic polymer may be present in an amount of from greater than 0 to 99 wt %, 10 to 98 wt %, 20 to 96 wt %, 30 to 95 wt %, 35 to 94 wt %, or 40 to 93 wt %, based on a total weight of the foamable composition.

Accordingly, the LDPE-co-PDMS may be included in the foamable composition in an amount of from 1 wt % to 99 wt %, from 1 wt % to 95 wt %, from 1 wt % to 90 wt %, from 1 wt % to 80 wt %, from 1 wt % to 70 wt %, from 1 wt % to 60 wt %, from 1 wt % to 50 wt %, from 1 wt % to 25 wt %, from 1 wt % to 10 wt %, from 10 wt % to 99 wt %, from 10 wt % to 95 wt %, from 10 wt % to 90 wt %, from 10 wt % to 80 wt %, from 10 wt % to 70 wt %, from 10 wt % to 60 wt %, from 10 wt % to 50 wt %, from 10 wt % to 25 wt %, from 20 wt % to 99 wt %, from 20 wt % to 95 wt %, from 20 wt % to 90 wt %, from 20 wt % to 80 wt %, from 20 wt % to 70 wt %, from 20 wt % to 60 wt %, from 20 wt % to 50 wt %, from 20 wt % to 25 wt %, from 30 wt % to 99 wt %, from 30 wt % to 95 wt %, from 30 wt % to 90 wt %, from 30 wt % to 80 wt %, from 30 wt % to 70 wt %, from 30 wt % to 60 wt %, from 30 wt % to 50 wt %, from 40 wt % to 99 wt %, from 40 wt % to 95 wt %, from 40 wt % to 90 wt %, from 40 wt % to 80 wt %, from 10 wt % to 70 wt %, from 40 wt % to 60 wt %, from 40 wt % to 50 wt %, from 50 wt % to 99 wt %, from 50 wt % to 95 wt %, from 50 wt % to 90 wt %, from 50 wt % to 80 wt %, from 50 wt % to 70 wt %, or from 50 wt % to 60 wt %, based on a total weight of the foamable composition.

In embodiments, one or more antistatic agents, pigments, fillers, or other additives may be included in the composition. Other additives can include, by way of example and not limitation, antioxidants, acid scavengers, ultraviolet light absorbers, flame retardants, processing aids, extrusion aids, or the like. When present, such additives may be present in an amount from greater than 0 to 20 wt %, based on a total weight of the foamable composition.

In embodiments, the physical blowing agent is added to the extruder at a location downstream from the extruder inlet and at a temperature and pressure sufficient to prevent the blowing agent from creating expansion of the polymer composition within the extruder or other suitable melt processing equipment and to enable homogeneous dispersion of the blowing agent within the composition.

Following addition of the physical blowing agent, the composition including the LDPE-co-PDMS, the physical blowing agent, and, optionally, the permeability modifier (referred to herein as the "foamable composition") is cooled to a foaming temperature. For example, the foamable composition can be cooled in a cooling extruder. In embodiments, the foaming temperature is within a range of from 10° C. less than the peak melting temperature of the LDPE-co-PDMS to 10° C. greater than the peak melting temperature of the LDPE-co-PDMS. In embodiments, the foaming temperature is from about 50° C. to about 180° C. For example, the foaming temperature may be from 70° C. to 160° C., from 90° C. to 140° C., from 100° C. to 130° C., from 100° C. to 120° C., from 100° C. to 110° C., from 105° C. to 110° C., or from 105° C. to 118° C.

Without being bound by theory, it is believed that, in embodiments, the LDPE-co-PDMS enables the power to the extruder(s) to be decreased, as the foamable composition exhibits improved processability by increased lubricity, in addition to the increased blowing efficiency. Moreover, it is believed that because of the possibly greater polydispersity index and greater shear-thinning of the LDPE-co-PDMS, the foamable composition will exhibit less shear-heating, which can lead to improved cooling on large scale lines.

After cooling to the foaming temperature, in embodiments, the foamable composition is propelled from an exit die at the end of the cooling extruder and cured to form a foam composition. Foaming is accomplished when the foamable composition exits through a die of the extruder to a region of lower pressure, as compared to the pressure within the extruder, such that the foamable composition experiences a pressure drop as it exits the exit die of the extruder. The pressure drop causes the physical blowing agent to expand the foamable composition, thereby leading to foaming.

In embodiments, the resultant foam has a density of less than or equal to 0.200 g/cm$^3$ as measured in accordance with ASTM D1622-88 at 25° C. For example, in embodiments, the foam has a density of from 0.015 to 0.200 g/cm$^3$, from 0.025 to 0.200 g/cm$^3$, from 0.050 to 0.200 g/cm$^3$, from 0.075 to 0.200 g/cm$^3$, from 0.090 to 0.200 g/cm$^3$, form 0.015 to 0.150 g/cm$^3$, from 0.025 to 0.150 g/cm$^3$, from 0.050 to 0.150 g/cm$^3$, from 0.075 to 0.150 g/cm$^3$, from 0.090 to 0.150 g/cm$^3$, from 0.015 to 0.100 g/cm$^3$, from 0.025 to 0.100 g/cm$^3$, from 0.050 to 0.100 g/cm$^3$, from 0.075 to 0.100 g/cm$^3$, or from 0.090 to 0.100 g/cm$^3$. In embodiments, the foam is an open-cell foam, while in other embodiments, the foam is a closed-cell foam. For example, in embodiments, the foam may be an open-cell foam having a density of from 0.090 to 0.200 g/cm$^3$. As another example, in embodiments, the foam may be a closed-cell foam having a density of from 0.015 to 0.200 g/cm$^3$.

Uses

Embodiments of the silicone-functionalized polyethylene foam described herein may be in any known physical form, including but not limited to, extruded sheets, rods, planks, films, and the like. Such foams may be used in, for example, cushion packaging, athletic and recreational products, egg cartons, meat trays, building and construction, acoustical insulation, pipe insulation, gaskets, vibration pads, luggage liners, desk pads, shoe holes, gymnastic mats, insulation blankets for greenhouses, case inserts, absorptive foams (e.g., to clean up oil spills, for health and hygiene applications, etc.) and display foams. Other applications, such as insulation for refrigeration, buoyancy applications, and floral and craft applications, are contemplated and possible.

Testing Methods

The test methods include the following:

Melt Index ($I_2$)

Melt index ($I_2$) is measured in accordance with ASTM D-1238 at 190° C. at 2.16 kg. The values are reported in g/10 min (or dg/min), which corresponds to grams eluted per 10 minutes.

Density

Density of foams are measured in accordance with ASTM D1622-88 at 25° C. and reported in grams/cubic centimeter (g/cc or g/cm$^3$). Density of polymers are measured in accordance with ASTM D792 at 25° C. and reported in grams/cubic centimeter (g/cc or g/cm$^3$).

Melt Strength

Melt strength measurements were conducted on a Gottfert Rheotens 71.97 (Goettfert Inc.; Rock Hill, S.C.), attached to a Gottfert Rheotester 2000 capillary rheometer. The melted sample (about 25 to 30 grams) was fed with a Goettfert Rheotester 2000 capillary rheometer, equipped with a flat entrance angle (180 degrees) of length of 30 mm, diameter of 2.0 mm, and an aspect ratio (length/diameter) of 15. After equilibrating the samples at 190° C. for 10 minutes, the piston was run at a constant piston speed of 0.265 mm/second. The standard test temperature was 190° C. The sample was drawn uniaxially to a set of accelerating nips, located 100 mm below the die, with an acceleration of 2.4 mm/$s^2$. The tensile force was recorded as a function of the take-up speed of the nip rolls. Melt strength was reported as the plateau force (cN) before the strand broke. The following conditions were used in the melt strength measurements: plunger speed=0.265 mm/second; wheel acceleration=2.4 mm/$s^2$; capillary diameter=2.0 mm; capillary length=30 mm; and barrel diameter=12 mm.

DSC Crystallinity

Differential scanning calorimetry (DSC) can be used to measure the crystallinity of a sample at a given temperature for a wide range of temperatures. For the examples, a TA model Q1000 DSC (TA Instruments, New Castle, DE) equipped with an RCS (refrigerated cooling system) cooling accessory and an auto-sampler module was used to perform the tests. During testing, a nitrogen purge gas flow of 50 mL/min was used. Resins were compression-molded into 3 mm thick by 1 inch circular plaques at 350° C. for 5 minutes under 1500 psi pressure in air. The sample was then taken out of the press and placed on a counter top to cool to room temperature (approximately 25° C.). A 3-10 mg sample of the cooled material was cut into a 6 mm diameter disk, weighed, placed in a light aluminum pan, and crimped shut. The sample was then tested for its thermal behavior.

The thermal behavior of the sample was determined by changing the sample temperature upwards and downwards to create a response versus temperature profile. The sample was first rapidly heated to 180° C. and held at an isothermal state for 3 minutes in order to remove any previous thermal history. Next, the sample was cooled to −40° C. at a 10° C./min cooling rate and held at −40° C. for 3 minutes. The sample was then heated to 150° C. at a 10° C./min heating rate. The cooling and second heating curves were recorded. The values determined were peak melting temperature ($T_m$), peak crystallization temperature ($T_c$), heat of fusion ($H_f$) (in J/g), and the calculated percent crystallinity for polyethylene samples using the following Equation 1:

$$\%\ \text{crystallinity} = \frac{H_f}{292\ \text{J/g}} \times 100 \quad \text{(Eq. 1)}$$

The heat of fusion ($H_f$) and the peak melting temperature are reported from the second heat curve. Peak crystallization temperature was determined from the cooling curve.

Gel Permeation Chromatography (GPC)

The GPC system consists of a PolymerChar GPC-IR (Valencia, Spain) high temperature GPC chromatograph equipped with an internal IR5 infra-red detector (IR5) and 4-capillary solution viscometer (DV) coupled to a Precision Detectors (now Agilent Technologies, Amherst, MA) 2-angle light scattering (LS) detector Model 2040. A GPC with the last two independent detectors and at least one of the first detectors is sometimes referred to as "3D-GPC", while the term "GPC" alone generally refers to "conventional GPC". For all absolute light scattering measurements, the 15-degree angle was used for measurement. The autosampler oven compartment was operated at 160° C. and the column compartment was operated at 150° C. The columns used were 4 Agilent "Mixed A" 30 cm 20-micron linear mixed-bed columns. The chromatographic solvent used was 1,2,4 trichlorobenzene and contained 200 ppm of butylated hydroxytoluene (BHT). The solvent source was sparged with nitrogen. The polyethylene samples were gently stirred at 160° C. for four hours. The injection volume was 200 μL. The flow rate through the GPC was set at 1 mL/minute.

The GPC column set was calibrated before running the examples by running at least twenty narrow molecular weight distribution polystyrene standards. The molecular weight (MW) of the standards ranged from 580 to 8,400,000 grams per mole, and the standards were contained in 6 "cocktail" mixtures. Each standard mixture had at least a decade of separation between individual molecular weights. The standard mixtures were purchased from Agilent Technologies. The polystyrene standards were prepared at 0.025 g in 50 mL of solvent for molecular weights equal to or greater than 1,000,000 g/mol and 0.05 g in 50 mL of solvent for molecular weights less than 1,000,000 g/mol. The polystyrene standards were dissolved at 80° C. with gentle agitation for 30 minutes. The narrow standards mixtures were run first and in order of decreasing highest molecular weight component to minimize degradation. The polystyrene standard peak molecular weights were converted to polyethylene molecular weight using Equation 2 (as described in Williams and Ward, *J. Polym. Sci., Polym. Let.*, 6, 621 (1968)):

$$M_{polyethylene} = A \times (M_{polystyrene})^B \quad \text{(Eq. 2)}$$

where M is the molecular weight of polyethylene or polystyrene (as marked), A has a value of 0.43, and B is equal to 1.0.

A polynomial between $3^{rd}$ and $5^{th}$ order was used to fit the respective polyethylene-equivalent calibration points. The total plate count of the GPC column set was performed with Eicosane (prepared at 0.04 g in 50 mL of TCB and dissolved for 20 minutes with gentle agitation). The plate count (Equation 3) and symmetry (Equation 4) were measured on a 200 μL injection according to the following equations:

$$\text{Plate Count} = 5.54 * \left(\frac{RV_{Peak\ Max}}{\text{Peak Width at } \frac{1}{2} \text{ height}}\right)^2 \quad \text{(Eq. 3)}$$

where RV is the retention volume in mL, the peak width is in mL, the peak max is the maximum height of the peak, and ½ height is ½ height of the peak maximum.

$$\text{Symmetry} = \frac{(\text{Rear Peak } RV_{one\ tenth\ height} - RV_{Peak\ max})}{(RV_{Peak\ max} - \text{Front Peak } RV_{one\ tenth\ height})} \quad \text{(Eq. 4)}$$

where RV is the retention volume in mL and the peak width is in mL, Peak max is the maximum position of the peak, one tenth height is 1/10 height of the peak maximum, and where rear peak refers to the peak tail at later retention volumes than the peak max and where front peak refers to the peak front at earlier retention volumes than the peak max. The plate count for the chromatographic system should be greater than 24,000 and symmetry should be between 0.98 and 1.22.

Samples were prepared in a semi-automatic manner with the PolymerChar "Instrument Control" Software, wherein the samples were weight-targeted at 2 mg/mL and the solvent (contained 200 ppm BHT) was added to a pre-nitrogen-sparged septa-capped vial, via the PolymerChar high temperature autosampler. The samples were dissolved for 2 hours at 160° C. under "low speed" shaking.

The calculations of $Mn_{(GPC)}$, $Mw_{(GPC)}$, and $Mz_{(GPC)}$ were based on the GPC results using the internal IR5 detector (measurement channel of the PolymerChar GPC-IR chromatograph according to Equations 5-7, using PolymerChar GPCOne™ software, the baseline-subtracted IR chromatogram at each equally-spaced data collection point (i), and the polyethylene equivalent molecular weight obtained from the narrow standard calibration curve for the point (i) from Equation 2.

$$Mn_{(GPC)} = \frac{\sum^{i} IR_i}{\sum^{i} \left(IR_i / M_{polyethylene_i}\right)} \quad \text{(Eq. 5)}$$

$$Mw_{(GPC)} = \frac{\sum^{i} \left(IR_i * M_{polyethylene_i}\right)}{\sum^{i} IR_i} \quad \text{(Eq. 6)}$$

$$Mz_{(GPC)} = \frac{\sum^{i} \left(IR_i * M^2_{polyethylene_i}\right)}{\sum^{i} \left(IR_i * M_{polyethylene_i}\right)} \quad \text{(Eq. 7)}$$

In order to monitor the deviations over time, a flow rate marker (decane) was introduced into each sample via a micropump controlled with the PolymerChar GPC-IR system. This flow rate marker (FM) was used to linearly correct the pump flow rate (Flowrate(nominal)) for each sample by RV alignment of the respective decane peak within the sample (RV(FM Sample)) to that of the decane peak within the narrow standards calibration (RV(FM Calibrated)). Any changes in the time of the decane marker peak are then assumed to be related to a linear-shift in flow rate (Flowrate (effective)) for the entire run. To facilitate the highest accuracy of a RV measurement of the flow maker peak, a least-squares fitting routine is used to fit the peak of the flow marker concentration chromatogram to a quadratic equation. The first derivative of the quadratic equation is then used to solve for the true peak position. After calibrating the system based on a flow marker peak, the effective flow rate (with respect to the narrow standards calibration) is calculated as Equation 8. Processing of the flow marker peak was done via the PolymerChar GPCOne™ Software. Acceptable flow rate correction is such that the effective flow rate should be within +/−2% of the nominal flow rate.

$$\text{Flowrate}_{(effective)} = \text{Flowrate}_{(nominal)} * \left(\frac{RV_{(FM\ Calibrated)}}{RV_{(FM\ Sample)}}\right) \quad \text{(Eq. 8)}$$

PDI is computed as Mw divided by Mn (i.e. Mw/Mn).

Triple Detector GPC (3D-GPC)

The chromatographic system, run conditions, column set, column calibration, and calculation conventional molecular weight moments and the distribution were performed according to the method described in the Gel Permeation Chromatography (GPC).

For the determination of the viscometer and light scattering detector offsets from the IR5 detector, the systematic approach for the determination of multiple detector offsets was performed in a manner consistent with that published by Balke, Mourey, et al. (Mourey and Balke, *Chromatorgraphy Polym.*, Chapter 12, (1992)) (Balke, Thitiratsakul, Lew, Cheung, Mourey, *Chromatography Polym.*, Chapter 13, (1992)), optimizing triple detector log ($M_w$ and intrinsic viscosity) results from a broad homopolymer polyethylene standard (Mw/Mn>3) to the narrow standard column calibration results from the narrow standards calibration curve using PolymerChar GPCOne™ Software.

The absolute molecular weight data was obtained in a manner consistent with that published by Zimm (Zimm, B. H., *J. Chem. Phys.*, 16, 1099 (1948)) and Kratochvil (Kratochvil, P., *Classical Light Scattering from Polymer Solutions*, Elsevier, Oxford, NY (1987)). The overall injected concentration used in the determination of the molecular weight is obtained from the mass detector area and the mass detector constant derived from a suitable linear polyethylene homopolymer, or one of the polyethylene standards of known weight-average molecular weight. The calculated molecular weights (using GPCOne™) are obtained using a light scattering constant derived from one or more of the polyethylene standards mentioned and a refractive index concentration coefficient, dn/dc, of 0.104. Generally, the mass detector response (IR5) and the light scattering constant (determined using GPCOne™) should be determined from a linear standard with a molecular weight in excess of about 50,000 g/mol. The viscometer calibration (determined using GPCOne™) can be accomplished using the methods described by the manufacturer or alternatively by using the published values of suitable linear standards such as Standard Reference Materials (SRM) 1475a (available from National Institute of Standards and Technology (NIST)). A viscometer constant (obtained using GPCOne™) is calculated which relates specific viscosity area (DV) and injected mass for the calibration standard to its intrinsic viscosity. The chromatographic concentrations are assumed low enough to eliminate addressing 2nd viral coefficient effects (concentration effects on molecular weight).

The absolute weight average molecular weight ($Mw_{(Abs)}$) is obtained (using GPCOne™) from the Area of the Light Scattering (LS) integrated chromatogram (factored by the light scattering constant) divided by the mass recovered from the mass constant and the mass detector (IR5) area. The molecular weight and intrinsic viscosity responses are linearly extrapolated at chromatographic ends where signal to noise becomes low (using GPCOne™). Other respective moments, $Mn_{(Abs)}$ and $Mz_{(Abs)}$ are calculated according to equations 9-10 as follows:

$$Mn_{(Abs)} = \frac{\sum^{i} IR_i}{\sum^{i} \left(IR_i / M_{Absolute_i}\right)} \quad \text{(Eq. 9)}$$

$$Mz_{(Abs)} = \frac{\sum^{i} \left(IR_i * M^2_{Absolute_i}\right)}{\sum^{i} \left(IR_i * M_{Absolute_i}\right)} \quad \text{(Eq. 10)}$$

PDI is computed as Mw divided by Mn (i.e. Mw/Mn).

High temperature liquid chromatography (HTLC)

High temperature liquid chromatography (HTLC) was employed for separation and characterization of Si-PE hybrid. Free PDMS was quantified by external standard calibration method. Sample solutions were prepared at ~2.0 mg/mL in anhydrous decane. Samples were dissolved using a lab heated shaker at 130° C. for ~1 hour. After that the sample solution was transferred to the PolymerChar autosampler. The sample solution was re-heated and shaken at 130° C. by the heated shaker in PolymerChar for 1 hour prior to injection. HTLC was based on the PolymerChar high temperature 2DLC/GPC instrument. LC pump was an Agilent 1260 HPLC system that was set a flow rate of 1.0 mL/min. Injection loop was a 20 μL of solution. A Thermo-Fisher hypercarb column (4.6 mm i.d.×100 mm 1., 5 um particle size and 260 Å pore size) held at 130° C. was used for the separation. The detector was an Agilent HT-ELSD detector (model G7826A) with the settings of nebulizer temperature 160° C.; evaporator temperature 120° C. and $N_2$ flow at 0.2 SLM. The gradient of decane to ODCB was applied in the separation. The data were collected by PolymerChar software version 1.1, and was reduced by Agilent SEC software Cirrus 3.3.

TABLE 1

| Gradient table | | |
|---|---|---|
| time | n-decane | ODCB |
| 0 | 100 | 0 |
| 10 | 100 | 0 |
| 20 | 0 | 100 |
| 25 | 0 | 100 |
| 30 | 100 | 0 |

Nuclear Magnetic Resonance (NMR)

The samples were prepared by adding 0.1 to 0.2 g of sample to 3.25 g of 50/50 by weight Tetrachlorethane-d2/Perchloroethylene with 0.001 M $Cr(AcAc)_3$ in a Norell 1001-7 10 mm NMR tube. The samples were purged by bubbling $N_2$ through the solvent via a pipette inserted into the tube for approximately 5 minutes to prevent oxidation, capped, and sealed with Teflon tape. The samples were heated and vortexed at 115-135° C. to ensure homogeneity. $^1H$ NMR was performed on a Bruker AVANCE 600 MHz spectrometer equipped with a Bruker 10 mm CryoProbe and a sample temperature of 120° C. The spectra were acquired with ZG pulse, 16 scans, AQ 1.8s, $D_1$ 14s. The polymer integral from about 0.6 to 2.6 ppm was set to an arbitrary value. This value divided by 2 gives the total moles of polymer $CH_{2s}$. Total moles $CH_2$ multiplied by 14 g/mol gives the polymer weight. The PDMS integral from about −0.3 to 0.6 ppm divided by 6 gives moles PDMS units. Multiplying by 74.1 g/mol PDMS unit gives the PDMS weight. The two weights are used to calculate wt % PDMS.

EXAMPLES

The following examples illustrate features of the present disclosure but are not intended to limit the scope of the disclosure.

Example 1

The f-PDMS was formed as a 1:2:1 mixture of the following three siloxanes:

| methacrylate functionalized PDMS MW = 15K | |
|---|---|
| F-PDMS | ratio |
| 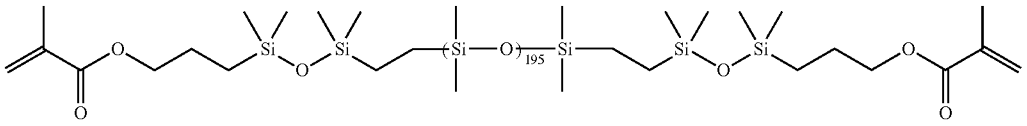 | 1 |
| 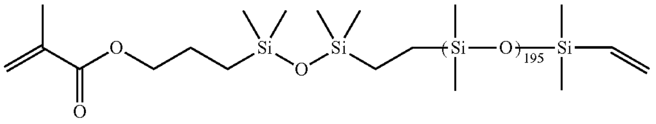 | 2 |
| 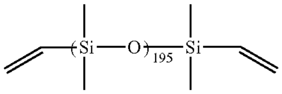 | 1 |

Polymerization was carried out in a continuously stirred tank reactor (CSTR) with a volume of 300 mL heated to 220° C. using four electric heater bands. The agitator speed was 1800 revolutions per minute (RPM). The reactor pressure was controlled to approximately 193 MPa. Propylene was used as a chain transfer agent. Ethylene and propylene were fed to the top of the reactor along the agitator shaft at a flow rate of 5440-5470 g/h ethylene in the ratios reported in Table 1, below. TPA and TPO were used as initiators in a 0.61:1 mass ratio. The initiators were diluted in ISOPAR E (available from ExxonMobil Chemical Co.) and injected into the side of the reactor at a pressure of 193 MPa at a ratio of 30-33 mass ppm TPA and 50-54 mass ppm TPO to ethylene. The f-PDMS was diluted in ethyl acetate (available from Sigma Aldrich) to 30 wt % and separately injected into the side of the reactor at a flow rate as reported in Table 1, below.

The reactor residence time was about 1.5 minutes. All unreacted reactants and polymer were emitted via a single outlet located on the bottom of the reactor. The LDPE-co-PDMS polymer was then separated from the remaining reactants by atomization, depressurizing the stream to about 0.1 MPa and simultaneously cooling the stream to ambient temperatures. The LDPE-co-PDMS polymer was then collected in powder form.

The process conditions by which the LDPE-co-PDMS polymers were made are reported in Table 2.

TABLE 2

| | Reaction Temp. (° C.) | Ethylene Conversion (wt %) | Propylene/ Ethylene (mol ppm) | f-PDMS/ Ethylene (mass ppm) |
|---|---|---|---|---|
| 10 wt % f-PDMS | 217.48 | 11.56 | 29600 | 13210 |

High temperature liquid chromatography (HTLC) was employed for separation and characterization of Si-PE hybrid. Free PDMS was quantified by an external standard calibration method.

DSC analysis of the LDPE-co-PDMS was performed and showed a peak melting temperature of 107.7° C. and a heat of fusion of 136.1 J/g.

The sample was additionally analyzed using conventional GPC and 3D-GPC. Table 3 reports the molecular weight properties for the sample.

TABLE 3

| Molecular Weight Properties of LDPE-co-PDMS | | | |
|---|---|---|---|
| Conventional GPC | | Absolute GPC (3D-GPC) | |
| Mn | 14,600 | Mn | 15,540 |
| Mp | 35,990 | Mw | 601,010 |
| Mv | 91,880 | Mz(BB) | 1,883,550 |
| Mw | 136,800 | Mz(abs) | 12,832,240 |
| Mz | 1,271,320 | Mz + 1(BB) | 2,952,220 |
| PDI (Mw/Mn) | 9.37 | Mz/Mw | 21.35 |

For comparison, DOW™ LDPE 450E, available from The Dow Chemical Company (Midland, MI), was analyzed using DSC, conventional GPC, and 3D-GPC. It exhibited a peak melting temperature of 110.8° C. and a heat of fusion of 157.5 J/g. Table 4 reports the molecular weight properties for DOW™ LDPE 450E.

TABLE 4

| Molecular Weight Properties of DOW ™ LDPE 450E | | | |
|---|---|---|---|
| Conventional GPC | | Absolute GPC (3D-GPC) | |
| Mn | 15,290 | Mn | 15,320 |
| Mp | 62,200 | Mw | 207,550 |
| Mv | 78,410 | Mz(BB) | 892,710 |
| Mw | 96,200 | Mz(abs) | 6,697,220 |
| Mz | 401,570 | Mz + 1(BB) | 1,995,320 |
| PDI (Mw/Mn) | 6.29 | Mz/Mw | 32.27 |

Accordingly, as can be seen from the data presented above, the LDPE-co-PDMS has a lower peak melting temperature and heat of fusion, and (in this particular instance) an increased PDI.

The melt strength of both the LDPE-co-PDMS and DOW™ LDPE 450E was also analyzed. The LDPE-co-PDMS exhibits a melt strength of about 8-9 cN at 190° C., which is similar to the melt strength of the LDPE 450E.

Amount of both attached and unattached PDMS was estimated by $^1H$ NMR, and showed 7.77 wt % of PDMS in the LDPE-co-PDMS. Amount of unattached f-PDMS was estimated by using HTLC analysis. Average value from two repetitions was 3.0 wt % of unattached PDMS in the LDPE-co-PDMS.

The LDPE-co-PDMS exhibits a melt index of about 3.5 dg/min. DOW™ LDPE 450E has a melt index of 2.0 dg/min. The density of DOW™ LDPE 450E was 0.923 g/cc, and that of LDPE-co-PDMS was 0.9256 g/cc.

Example 2

Next, foams were prepared using the LDPE-co-PDMS and/or DOW™ LDPE 450E. Foam compositions were prepared with a tandem extrusion system having a mixing extruder and a cooling extruder that was fed by the mixing extruder. The mixing extruder was a co-rotating twin screw extruder with 34 mm diameter screws specially configured to ensure good mixing of the polymer composition and blowing agent while forming the foamable composition. The mixing extruder was operated at a screw speed of 55 rpm and a set temperature across all zones of 180° C.

The cooling extruder was a single screw extruder with a 40 mm diameter screw. The barrel and the die temperatures of the cooling extruder were controlled among four zones using separate oil heaters. Zone 1 and Zone 2 were operated at set temperatures of 129° C. and 116° C., respectively. The set temperature of Zone 3 was the foaming temperature of the foamable composition. The cooling extruder was operated at a screw speed of 22 rpm. A 3 mm diameter rod die was attached at the end of the cooling extruder. The temperature of the die was maintained at 125° C.

The components of the polymer composition were dry blended and then fed into the inlet of the mixing extruder through a solid metering feeder. Complete melting of the polymer components was achieved and the blowing agent (isobutane), was injected into the mixing extruder at 20 L/D of the extruder using a positive displacement pump (dual piston HPLC pump). The flow rate of the polymer was maintained at 36 grams per minute (g/min). The residence time of the process, from addition of the solid components to the extruder inlet up to the exit die, was 12 minutes.

Foams of different compositions and densities were produced at various processing conditions, as set forth in Table 5. In particular, the foams of Ex. 1-Ex. 4 included LDPE-co-PDMS, while the CS1 was prepared using LDPE alone.

HS-E01 is a masterbatch of glycerol monostearate (GMS), a permeability modifier, in a LDPE carrier resin. It is available from Polyvel Inc. and has the following properties: GMS content of 50%, alpha mono content of 90%, white color, melt index of 320 g/10 min and softening point of 70° C.

Mistron Vapor R is talc with median particle size of 2.2 μm and is available from Imerys Talc.

TABLE 5

| | CS1 | Ex. 1 | Ex. 2 | Ex. 3 * | Ex. 4 |
|---|---|---|---|---|---|
| LDPE 450E (parts) | 97.5 | 82.9 | 68.2 | ~50 | 0 |
| LDPE-co-PDMS (parts) | 0 | 14.6 | 29.3 | ~50 | 97.5 |
| HS-E01 with glycerol monostearate (GMS) content of 50 wt % (parts) | 2 | 2 | 2 | 2 | 2 |
| Mistron Vapor R Talc (parts) | 0.5 | 0.5 | 0.5 | 0.5 | 0.5 |
| Polymer composition (total parts) | 100 | 100 | 100 | 100 | 100 |

TABLE 5-continued

| | CS1 | Ex. 1 | Ex. 2 | Ex. 3 * | Ex. 4 |
|---|---|---|---|---|---|
| Isobutane (parts) | 10 | 10 | 10 | 10 | 10 |
| Foamable composition (total parts) | 110 | 110 | 110 | 110 | 110 |
| Extruder Amps (Primary/Secondary) | 10/7 | 10/6 | 9/6 | 9/6 | 8/5 |
| Zone 3 Set Temperature (° C.) "Foaming Temperature" | 115.6 | 113.9 | 112.8 | ~112.5 | 108.9 |
| Properties of Foam Composition | | | | | |
| Density (g/cm$^3$) | 0.069 | 0.056 | 0.050 | ~0.040 | 0.090 |
| Cell type | closed | closed | closed | closed | open |

* Ex. 3 was by visual observation during the transition from Ex. 2 to Ex. 4

For each of CS1 and Ex. 1-Ex. 4, GMS was present in an amount of 1 wt % in the polymer composition, and the isobutane was present in an amount of 9 wt % in the foamable composition.

As reported in Table 5, the foams of Ex. 1, Ex. 2, and Ex. 3 were closed-cell in structure, while the foam of Ex. 4 was largely open-cell. Typically, such open-cell structures are not achievable with LDPE, even over a wide range of foaming temperatures. Additionally, the compositions of Ex. 1-4 tended to exhibit lower extruder amps than those of CS1, likely due in part to the presence of silicone in the LDPE-co-PDMS.

Moreover, the closed-cell foams of Ex. 1-3 were of significantly lower densities than the foam of CS1, using a fixed amount of isobutane blowing agent. Ex. 3 relates to visual observations made in transitioning from Ex. 2 to Ex. 4, when the foamed extrudate was observed to have increased significantly in diameter, which is indicative of a lower foam density, at about halfway through the change. The increased blowing efficiency observed in the Examples including the LDPE-co-PDMS is a valuable attribute to enable down-gauging, as well as to decrease the amount of blowing agent required for a given foam density. Without being bound by theory, the increased blowing efficiency may also be suggestive of decreased blowing agent permeability and/or increased blowing agent solubility, which could be beneficial when using fast-permeating blowing agents such as carbon dioxide.

In addition, by virtue of the silicone present in LDPE-co-PDMS as well as relatively greater polydispersity index (PDI; reported in Tables 1 and 2) and the greater shear-thinning of the LDPE-co-PDMS used in Ex. 1-4, less shear-heating and better cooling is anticipated on large scale (e.g., commercial) extrusion foaming lines.

It will be apparent that modifications and variations are possible without departing from the scope of the disclosure defined in the appended claims. More specifically, although some aspects of the present disclosure are identified herein as preferred or particularly advantageous, it is contemplated that the present disclosure is not necessarily limited to these aspects.

The invention claimed is:

1. An extruded foam formed from a composition comprising:

from 1 to 99 wt % of a silicone-functionalized polyethylene comprising a reaction product of the polymerization of ethylene monomer with methacrylic ester functionalized polydimethylsiloxane; and a physical blowing agent;

wherein the extruded foam has a density of less than or equal to 0.200 g/cm$^3$ as measured in accordance with ASTM D1622-88 at 25° C.

2. The extruded foam according to claim 1, wherein the silicone-functionalized polyethylene has a polydispersity index (PDI) of from 3 to 14.

3. The extruded foam according to claim 1, wherein the silicone-functionalized polyethylene comprises one or more of the following structures:

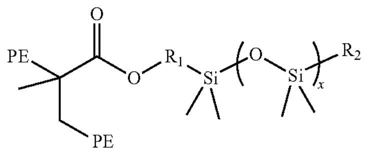

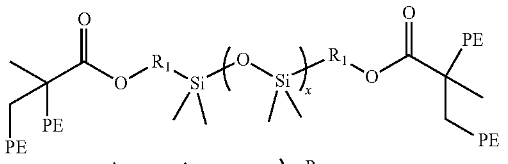

and

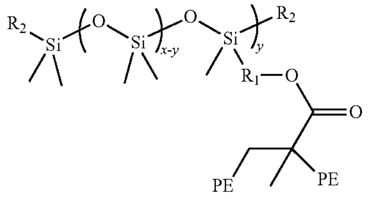

where $R_1$ is a bridge group that connects functional group methacrylate with siloxane, $R_2$ is an end group selected from the group consisting of alkyl, substituted alkyl, aryl, alkenyl, H, and OH, x is an integer from 10 to 1000, y is an integer from 1 to 20, and PE is an ethylene-based polymeric branch.

4. The extruded foam according to claim 1, wherein the composition further comprises from greater than 0 to 99 wt % of at least one additional olefinic polymer.

5. The extruded foam according to claim 4, wherein the at least one additional olefinic polymer comprises LDPE.

6. The extruded foam according to claim 1, wherein the composition further comprises from greater than 0 to 2 wt % permeability modifier.

7. The extruded foam according to claim 6, wherein the permeability modifier comprises an amide or an ester of a $C_{10}$ to $C_{24}$ fatty acid.

8. The extruded foam according to claim 1, wherein the physical blowing agent comprises carbon dioxide, hydrocarbons, or mixtures thereof.

9. The extruded foam according to claim 1, wherein the physical blowing agent is present in an amount of 5 to 20 wt %.

10. The extruded foam according to claim 1, wherein the extruded foam is open-cell.

11. The extruded foam according to claim 10, wherein the extruded foam has a density of from 0.090 to 0.200 $g/cm^3$.

12. The extruded foam according to claim 1, wherein the extruded foam is closed-cell.

13. The extruded foam according to claim 12, wherein the extruded foam has a density of from 0.015 to 0.200 $g/cm^3$.

14. The extruded foam according to claim 8, wherein the hydrocarbons are selected from isobutane, n-butane, isomers of pentane, or mixtures thereof.

* * * * *